(12) United States Patent
Takamori et al.

(10) Patent No.: US 6,648,694 B2
(45) Date of Patent: Nov. 18, 2003

(54) CONNECTOR FOR MEMORY CARD (75) Inventors: Satoshi Takamori, Kyoto (JP); Masami Nishida, Osaka (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/236,071

(22) Filed: Sep. 5, 2002

(65) Prior Publication Data

US 2003/0054694 A1 Mar. 20, 2003

(30) Foreign Application Priority Data

Sep. 7, 2001 (JP) ....................................... 2001-271918

(51) Int. Cl.[7] .............................................. H01R 24/00
(52) U.S. Cl. ...................................................... 439/630
(58) Field of Search ................................ 439/630, 636; 361/756, 759, 788

(56) References Cited

U.S. PATENT DOCUMENTS 6,206,710 B1 * 3/2001 Chen .......................... 439/159
6,293,464 B1 * 9/2001 Smalley, Jr. ................ 235/451
6,503,092 B1 * 1/2003 Sato ........................... 439/159

* cited by examiner

Primary Examiner—Hung V. Ngo
(74) Attorney, Agent, or Firm—Rosenthal & Osha L.L.P.

(57) ABSTRACT

A memory card connector is offered which has a locking function and which permits both a memory card having a locking recess in its side surface and a memory card having no locking recess in its side surface to be inserted and withdrawn. The connector comprises a connector body having a tapering guide groove, a slider provided with a slide groove perpendicular to the direction of sliding motion, a locking pawl engaged in the tapering guide groove of the connector body via a guide pin, and a first coil spring mounted to the slider. This slider is slidably mounted to the connector body via a second coil spring to form an alternate mechanism. The locking pawl is slidably fitted in the slide groove of the slider and can engage the locking recess formed in one side surface of the memory card. The first coil spring biases the locking pawl inward at all times.

2 Claims, 15 Drawing Sheets

Fig. 15

CONNECTOR FOR MEMORY CARD

BACKGROUND OF THE INVENTION

1. Field of the Invention

The present invention relates to a connector for use with a memory card.

2. Description of the Related Art

Conventionally, connectors for use with memory cards are available in various types. For example, one memory card has a locking recess in its side surface. Another memory card does not have such a locking recess in its side surface. If one attempts to connect such memory cards having different contours using one kind of connector, the used connector must have no locking mechanism, for the following reason. A connector having a locking mechanism locks a memory card having a locking recess by its locking pawls, thus preventing the card from coming off. On the other hand, where a memory card having no locking recess is inserted into such a connector, it is considered that the locking mechanism will be destroyed or the side surface of the memory card will be damaged, thus making the card unusable.

With a connector not having the aforementioned locking mechanism, however, it is impossible to make effective use of the contour of the memory card having a locking recess. Hence, there is the problem that it is not assured that the card is prevented from coming off.

SUMMARY OF THE INVENTION

In view of the foregoing problem, it is an object of the present invention to provide a memory card connector which has a locking function and permits both a memory card having a locking recess in its side surface and a memory card having no locking recess in its side surface to be inserted and withdrawn.

A connector according to the present invention achieves the above-described object and is used with a memory card having a one-end portion inserted from an opening portion. The connector can electrically connect the input/output interconnects of the card with an external circuit and lock the card. The connector has a connector body provided with a tapering guide groove extending perpendicular to the direction of slide. A slider is slidably mounted to the connector body via a coil spring to thereby form an alternate mechanism. A locking pawl is slidably fitted in the groove of the slider. The pawl is engaged in the tapering guide groove of the connector body via a guide pin. The pawl can engage a locking recess formed in one side surface of the memory card. A spring material is mounted to the slider and constantly biases the locking pawl inward. When the memory card is pushed in and the slider slides, the locking pawl engages the locking recess in the memory card. When the card is pushed out and the slider slides, the locking pawl comes out of the locking recess in the memory card.

According to the present invention, therefore, when the memory card having the locking recess is inserted, the locking pawl engages the locking recess and becomes locked. When a memory card having no locking recess is inserted, the locking pawl biased inward by the spring material is moved outward, thus accepting the memory card having no locking recess. Consequently, a connector is obtained with which memory cards with different shapes can be connected.

Even where the memory card having the locking recess is inserted, the locking pawl is merely biased by the spring member. Therefore, if the memory card is erroneously pulled out forcibly, the locking pawl is displaced outward. In consequence, the locking mechanism is not destroyed. The memory card is not damaged.

The memory card can be electrically connected with the connector in one push via the slider forming the alternate mechanism and the card is locked. Thus, the card is prevented from coming off. Furthermore, the slider is pushed back to its original position by the spring force of the coil spring by giving a push. Consequently, the memory card can be easily removed. Therefore, a connector is obtained which permits a memory card to be inserted and withdrawn easily and which provides convenience in use.

In one feature of the invention, the spring member can be a coil spring that gives a biasing force which rotates the locking pawl.

The present embodiment offers the advantage that the twisting force of the coil spring of the connector can be utilized and, therefore, the locking pawl can be biased with a desired biasing force even within a narrow space. The connector is easy to design and provides convenience in use.

BRIEF DESCRIPTION OF THE DRAWINGS

FIGS. 10A–D shows fragmentary enlarged views illustrating a procedure for mounting a memory card to the connector shown in FIG. 2;

FIGS. 11A–B shows fragmentary enlarged views illustrating a procedure for taking a memory card out of the connector shown in FIG. 2;

DESCRIPTION OF THE PREFERRED EMBODIMENTS

Embodiments of the present invention are described below by referring to FIGS. 1–15 of the accompanying drawings.

Figure 1:
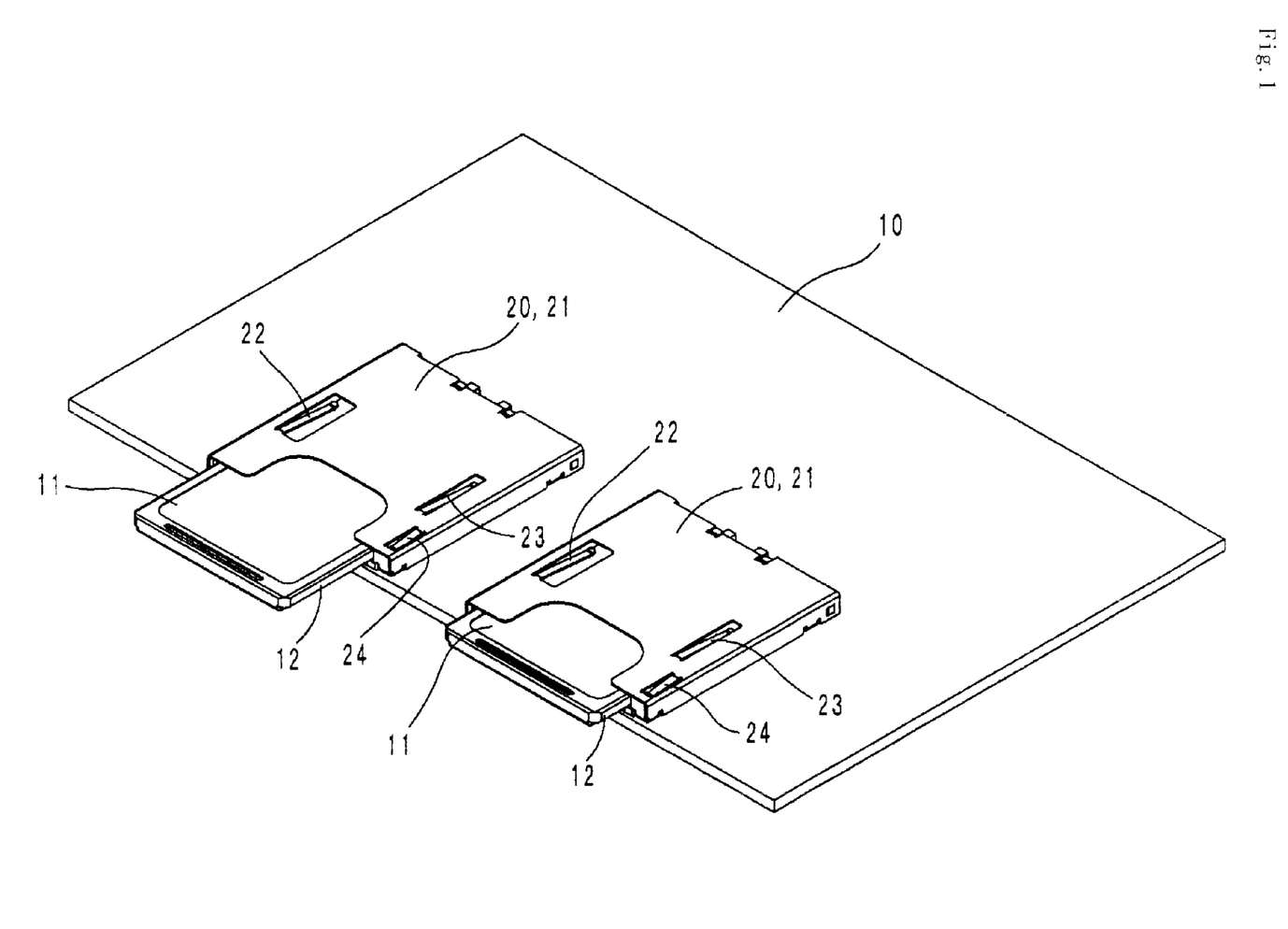
FIG. 1 is a perspective view illustrating a method of using a memory card connector according to the present invention.

An embodiment is illustrated in FIG. 1, where the present invention is applied to a connector 20 for electrically connecting a printed circuit board 10 and a memory card 11.

The printed circuit board 10 comprises an insulating board on which wiring is printed to form multiple interconnects. The memory card 11 is a rectangular card incorporating an IC memory. Ribs 12 are formed on both side surfaces of the card to prevent misinsertion. One side surface of the memory card 11 is provided with a recess 13 for locking purposes. A switch 14 for inhibiting writing is slidably formed on the other side surface. A cutout 15 (FIG. 2) is formed at one corner of the front end of the memory card to judge whether the insertion is incorrect or not. Furthermore, the memory card 11 has a plurality of juxtaposed input/output connection portions or interconnects 16 on its bottom surface (FIG. 3).

Figure 2:
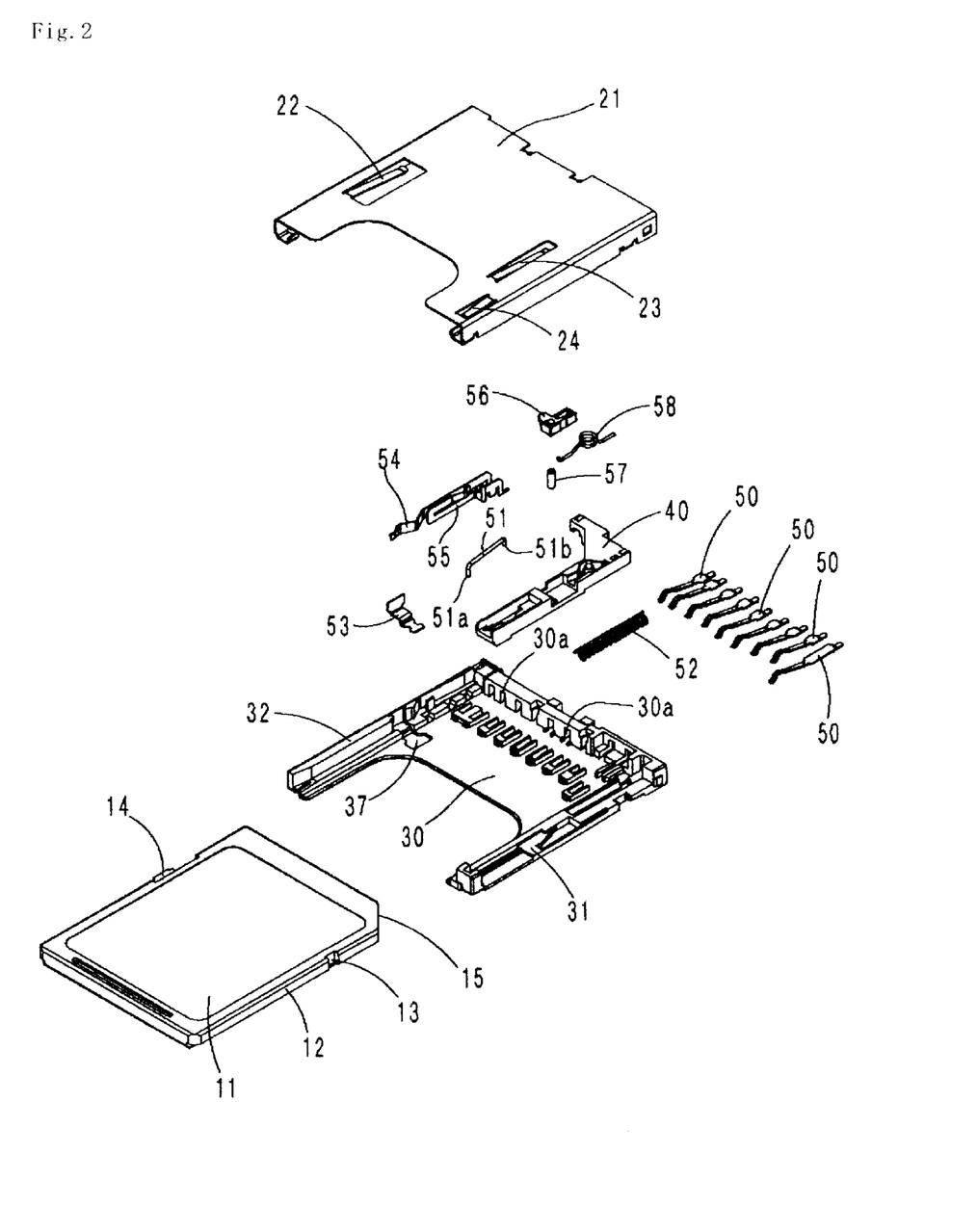
FIG. 2 is an exploded perspective view taken from above the connector shown in FIG. 1, and in which the memory card is not yet mounted.
Figure 3:
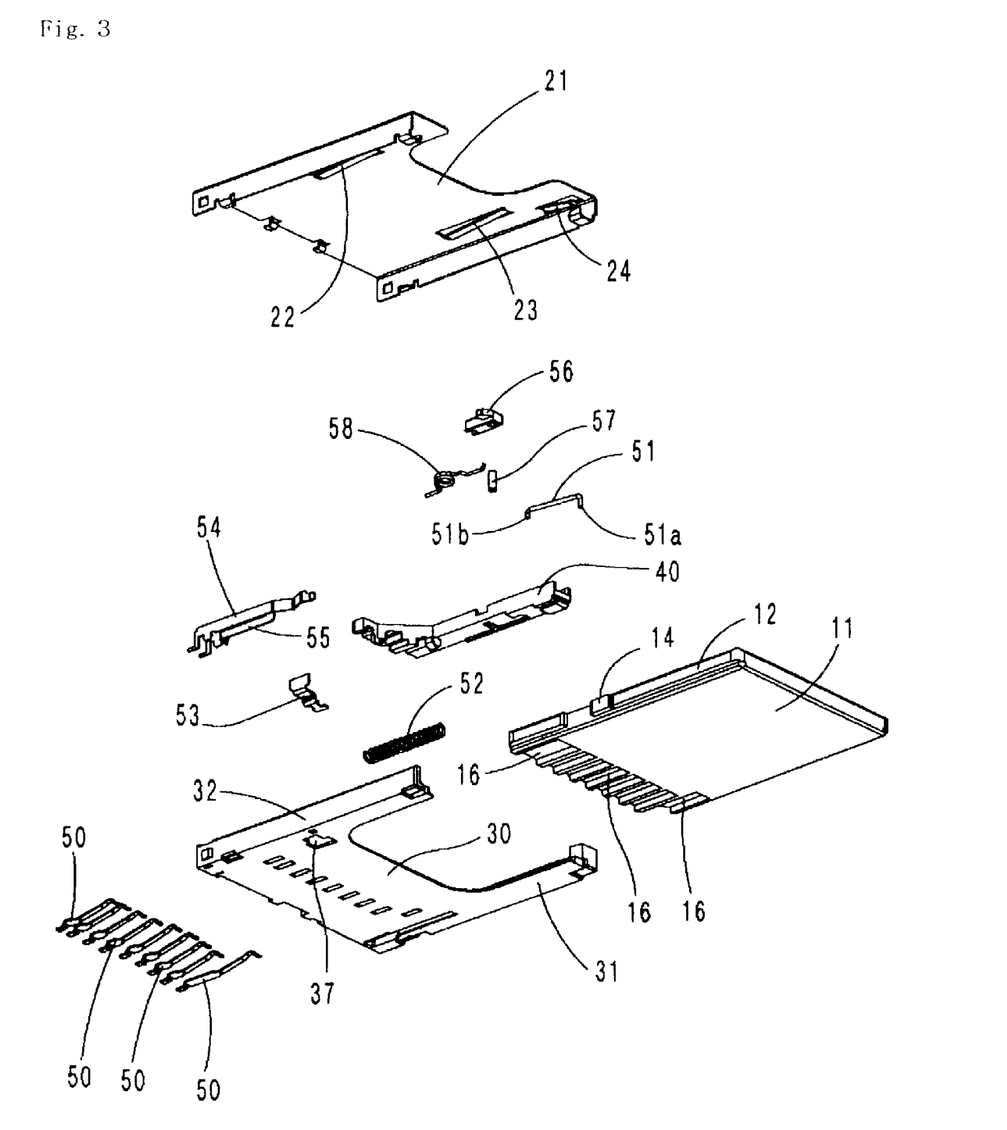
FIG. 3 is an exploded perspective view taken from below the connector shown in FIG. 1, and in which the card is not yet mounted.

The connector 20 is so designed that a slider 40 is squeezed from above and below by a top shell 21 and a flat, gatelike connector body 36, as shown in FIG. 2. The slider 40 is slidably mounted to one arm 31 of the connector body 30.

The top shell 21 has been stamped from a metal sheet and pressed. Resilient pawls 22 and 23 are carved out from near both ends of the top shell 21. A resilient pawl 24 is carved out from one corner to prevent a lever 51 (described later) from floating.

In the present embodiment, the connector is surface-mounted on the printed circuit board. Where connection with a flexible printed circuit (FPC), for example, is made, the connector body 30 may be squeezed from above and below by the top shell 21 and a bottom shell (not shown), and a connector for the FPC may be mounted to the connection end surface.

Figure 4:
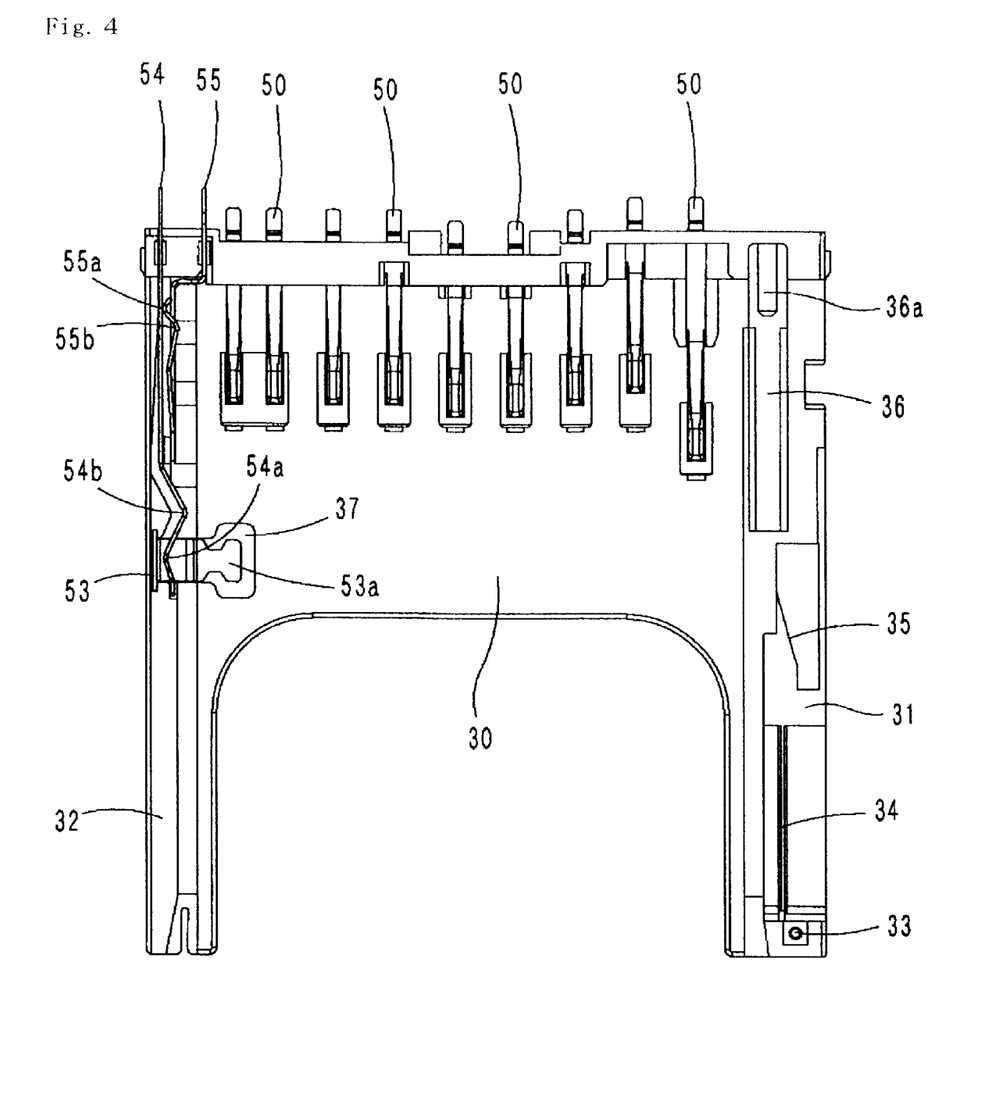
FIG. 4 is a plan view of a connector body according to the invention.
Figure 8:
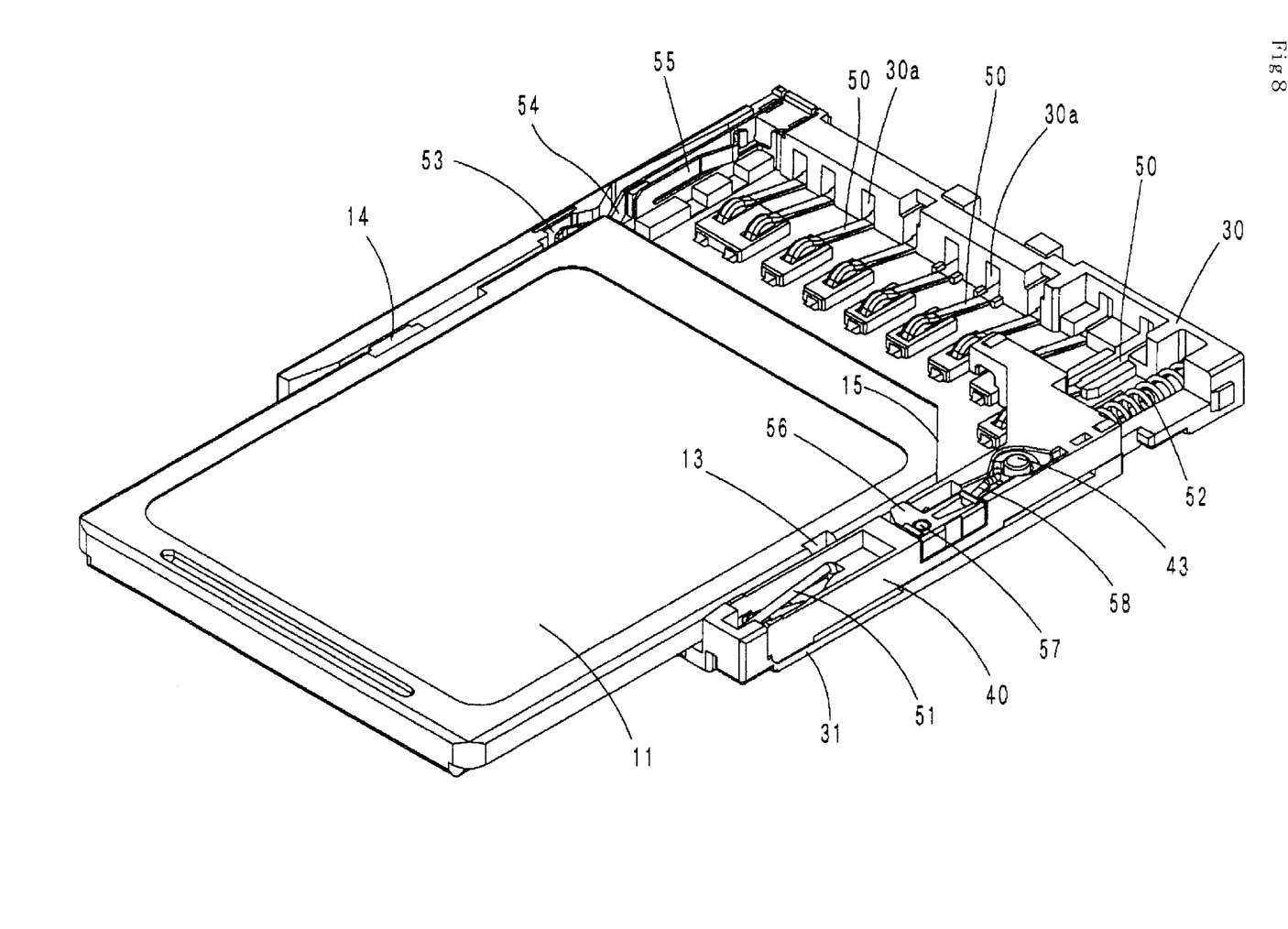
FIG. 8 is a perspective view showing the manner in which a memory card is being mounted to the connector shown in FIG. 2.
Figure 9:
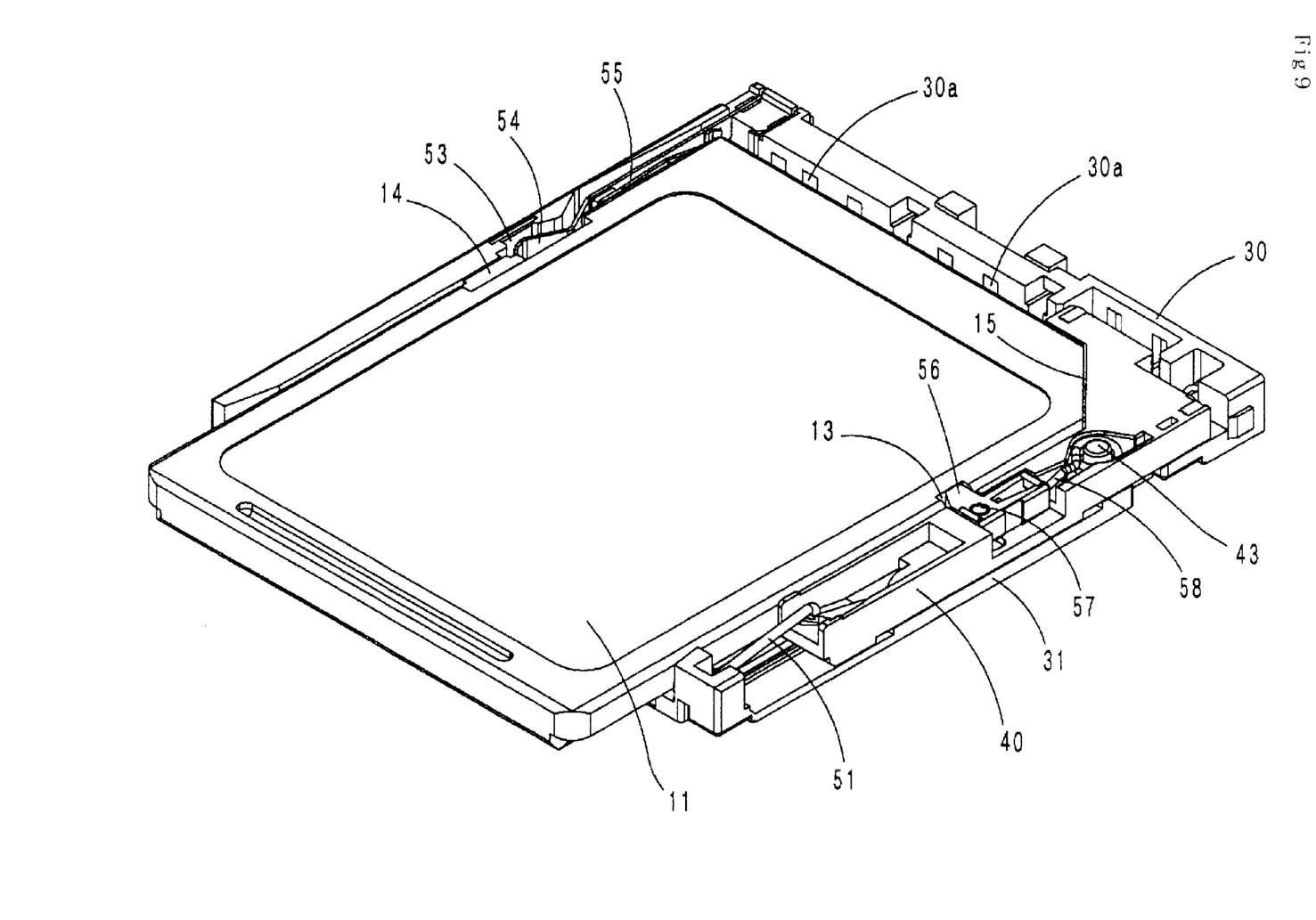
FIG. 9 is a perspective view similar to FIG. 8, but in which the memory card has been mounted to the connector shown in FIG. 2.

As shown in FIG. 8, the top end of the connector body 30 is provided with plural terminal holes 30a formed at a given pitch. Connector terminals 50 are pressed into the terminal holes 30a from the outside. As shown in FIG. 4, a support hole 33 (described later) is formed in the top end surface of the arm 31 of the arms 31 and 32 of the connector body 30, the hole 33 forming a pivot for rotation of the lever 51. A projection 34 for guiding the slider 40 (described later) is formed near the hole 33. A tapering guide groove 35 is formed near one end of the projection 34. A slit 36 for accommodating a coil spring 52 (described later) is formed near one end of the guide groove 35. A support protrusion 36a that supports the coil spring 52 protrudes into the slit 36.

Figure 7:
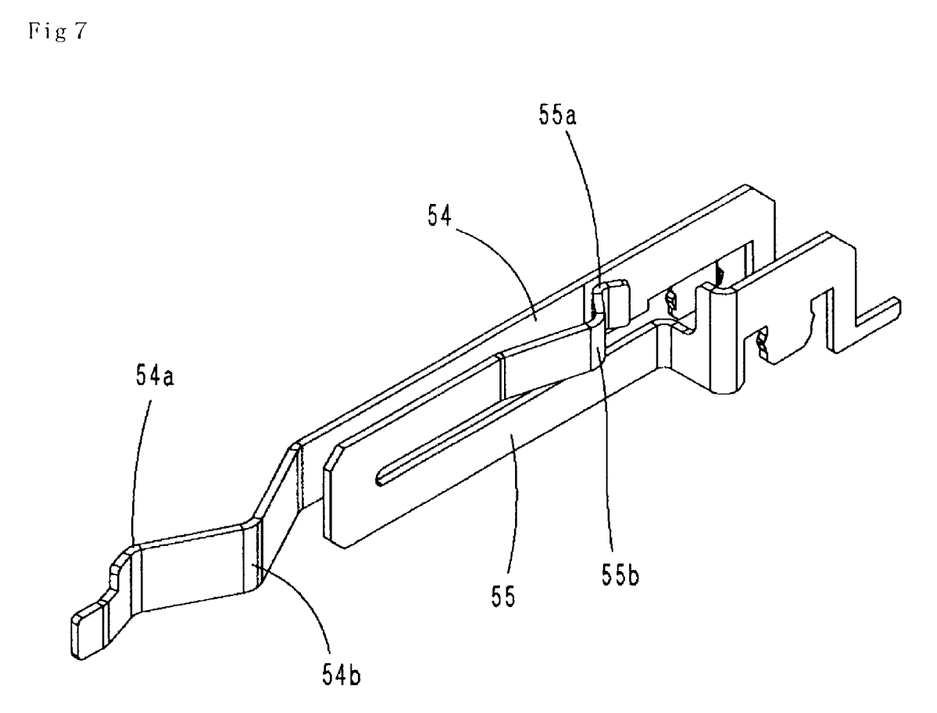
FIG. 7 is a perspective view taken above a write inhibit switch shown in FIG. 2.
Figure 12:
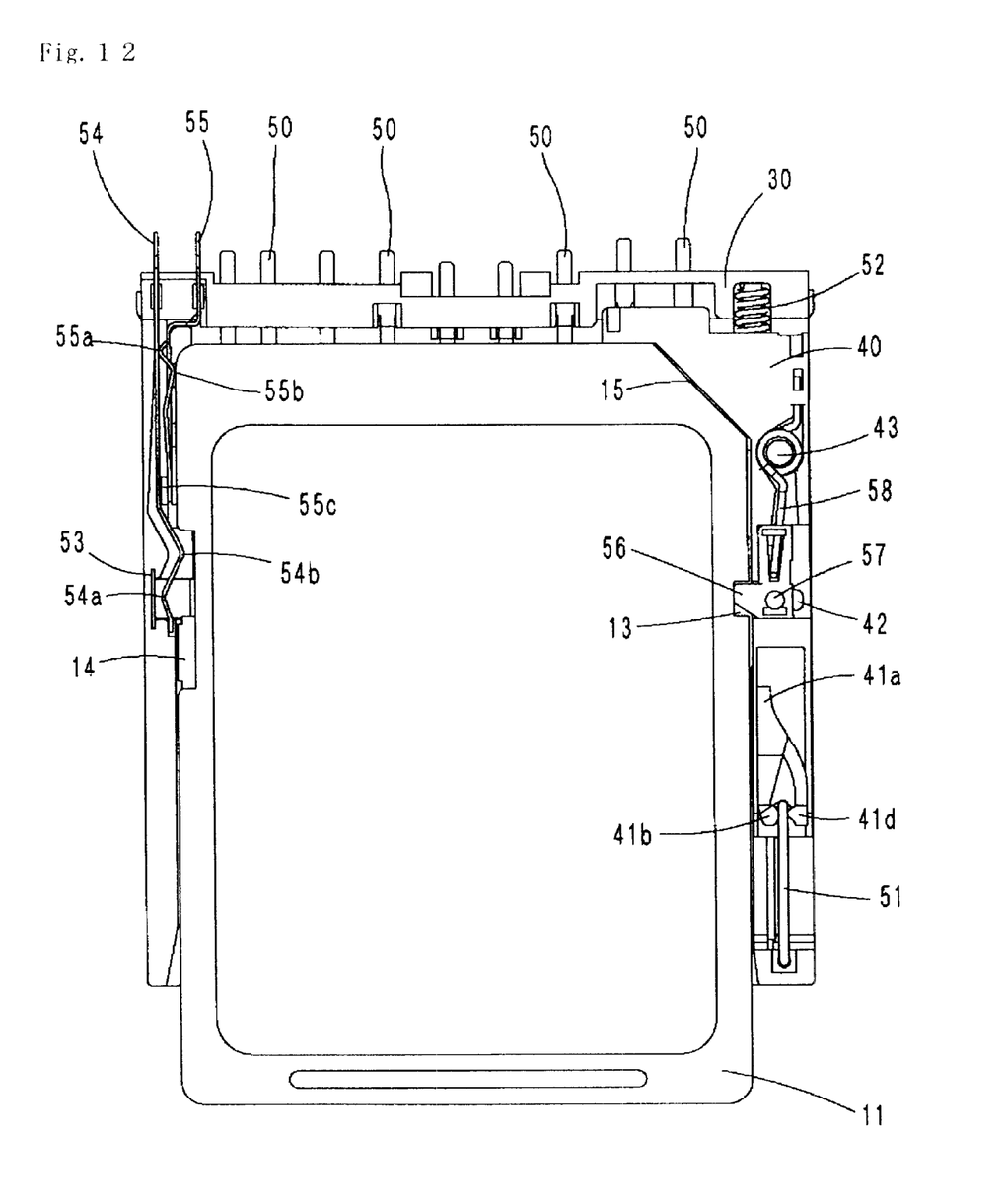
FIG. 12 is a plan view, and in which a memory card set to inhibit writing is mounted to the connector shown in FIG. 2.
Figure 13:
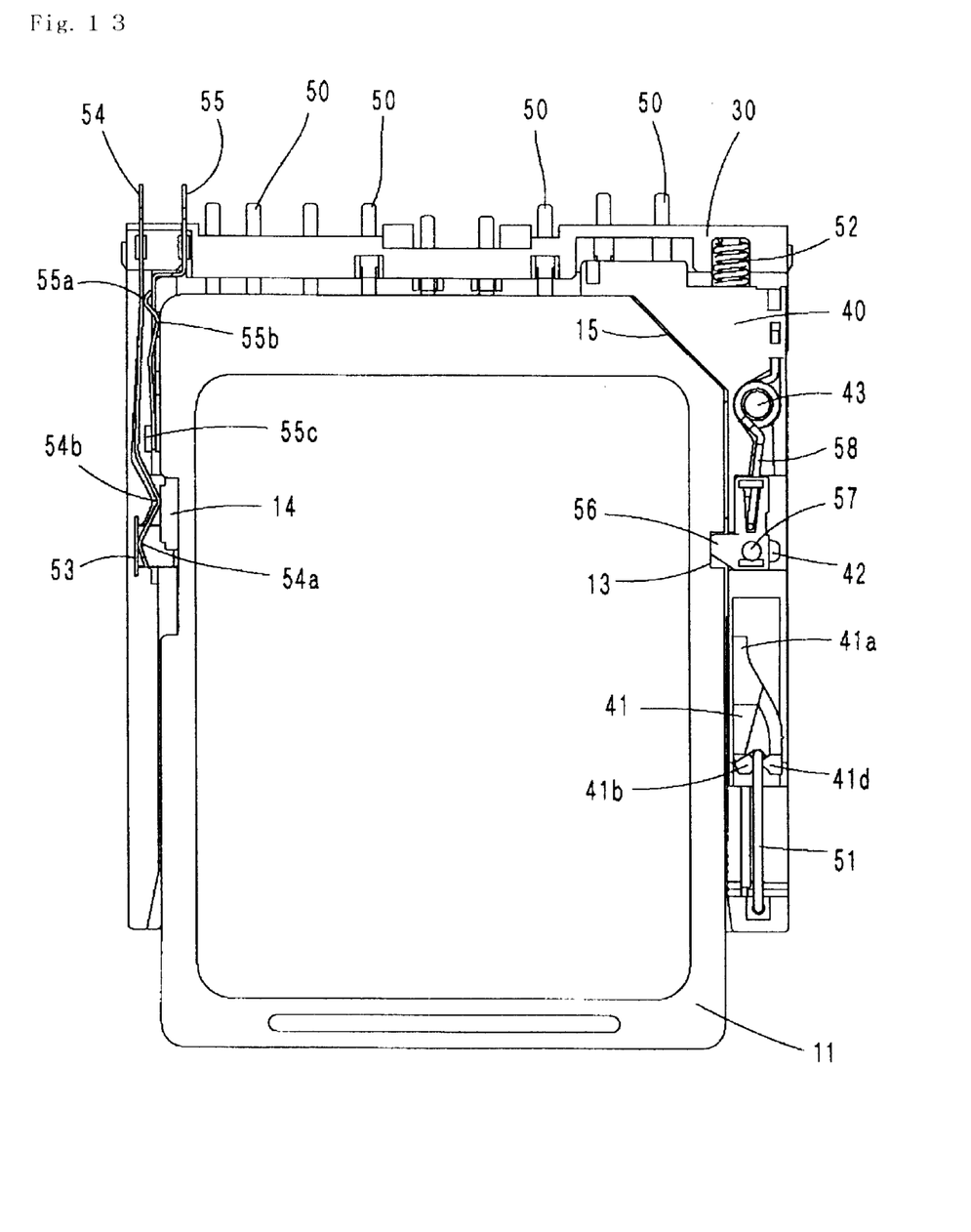
FIG. 13 is a plan view, and in which a memory card set to enable writing is mounted to the connector shown in FIG. 2.

A terminal hole 37 is formed in the base portion of the other arm 32 of the connector body 30. The bottom surface of a connection portion 53a of a fixed contact terminal 53 mounted to the connector body 30 is exposed from the terminal hole 37 so as to be connectable. A first movable contact member 54 and a second movable contact member 55 are mounted near one end of the connector body 30. The fixed contact terminal 53, first movable contact terminal 54, and second movable contact terminal 55 together form a switch used to judge whether the memory card 14 has been set to inhibit writing. As shown in FIG. 7, a movable contact portion 54a and a pressure contact portion 54b which make contact with the fixed contact terminal 53 are formed on the first movable contact terminal 54 by stamping and bending a conductive spring member. Similarly, a movable contact portion 55a and a pressure contact portion 55b which make contact with the movable contact terminal 54 are formed on the second movable contact terminal 55 by stamping and bending a conductive spring member. In FIGS. 12 and 13, indicated by 55c is an insulating spacer.

Figure 5:
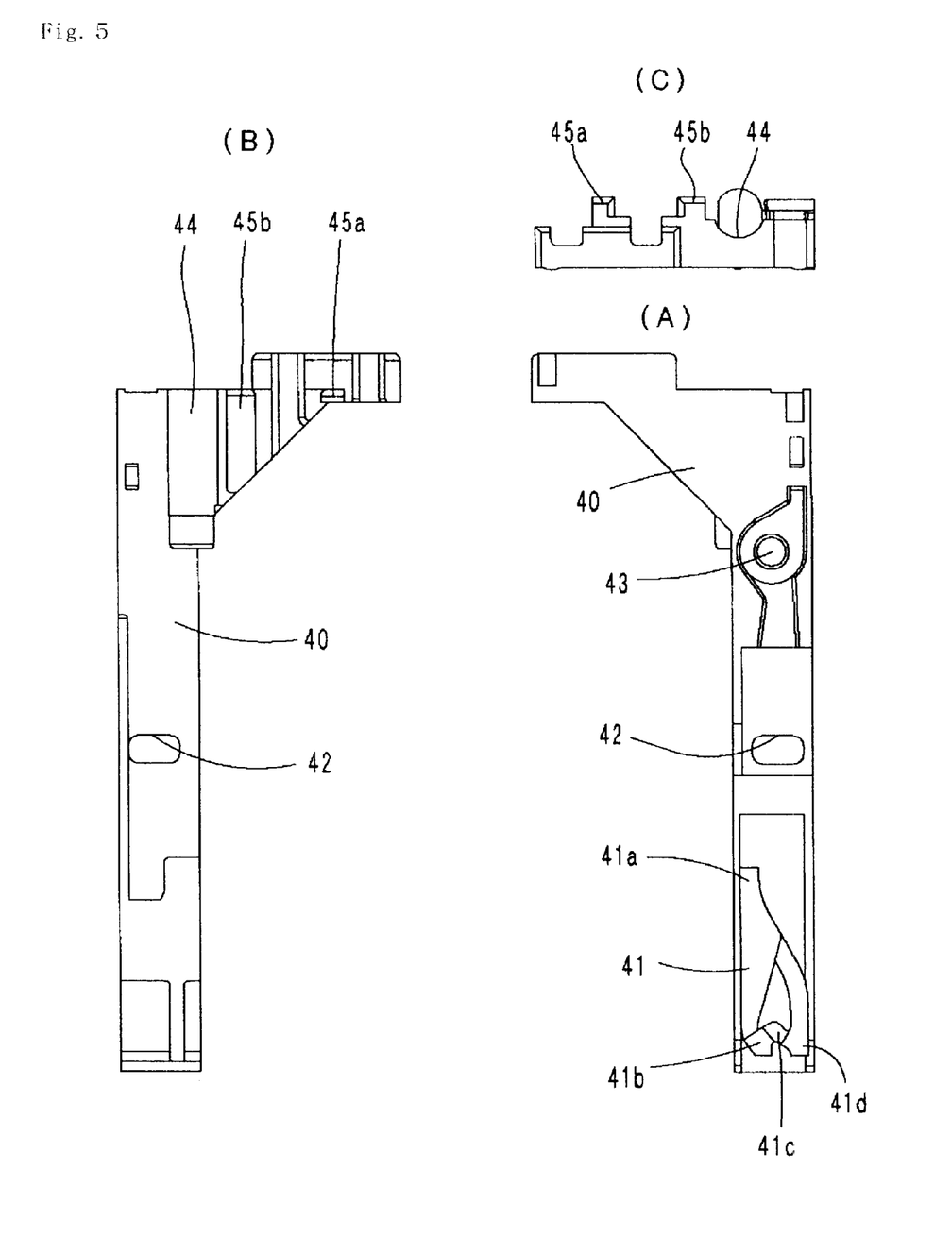
FIG. 5A is a front elevation of a slider according to the invention.
FIG. 5B is a rear view of the slider.
FIG. 5C is a plan view of the slider.
Figure 6:
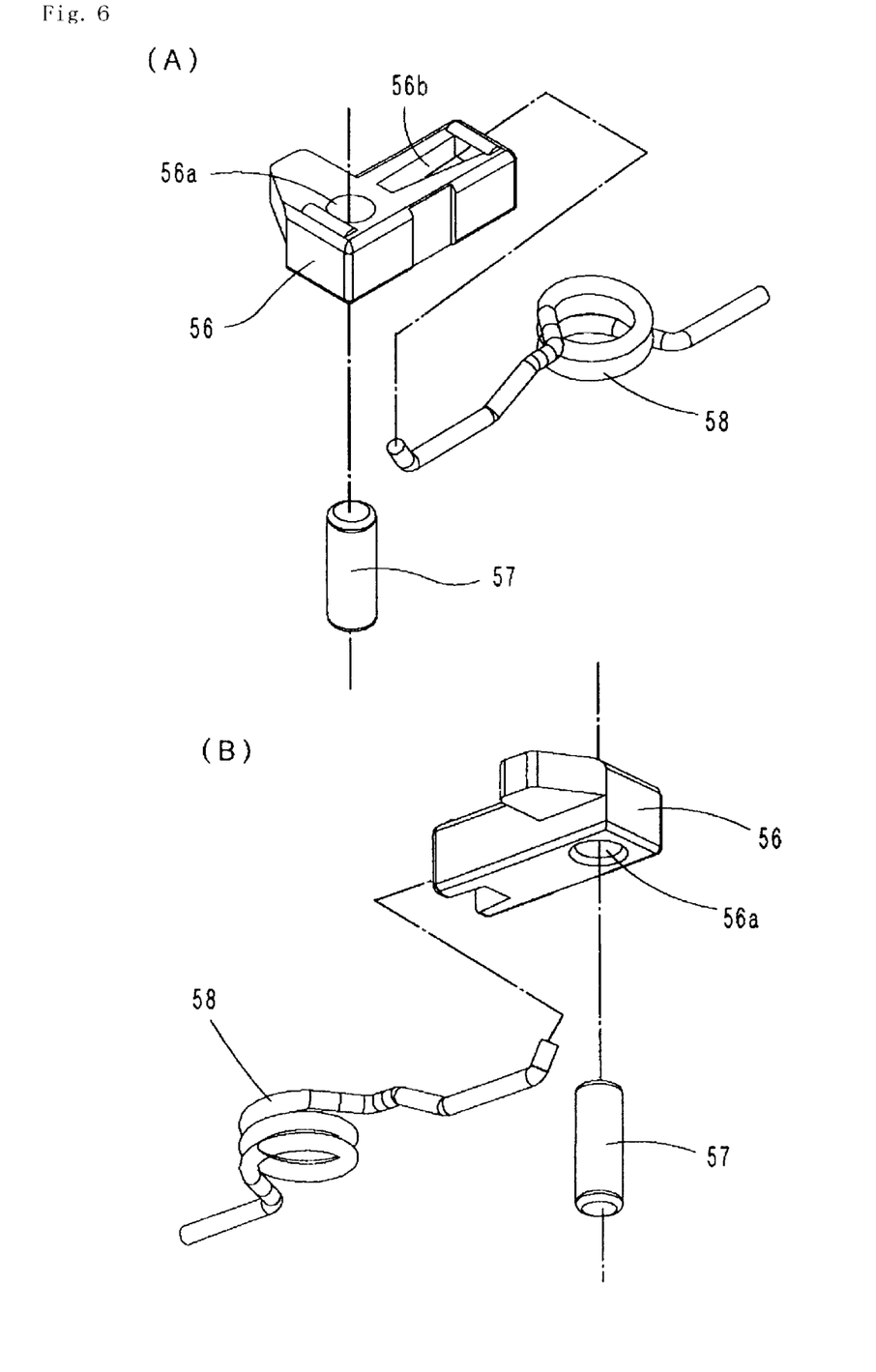
FIG. 6A is a perspective view taken from above a locking pawl, a guide pin, and a coil spring shown in FIG. 2.
FIG. 6B is a perspective view taken from below these components.

As shown in FIG. 5, the aforementioned slider 40 is a molded plastic product having a cross-sectional shape capable of slidably fitting over the guide projection 34 of one arm 31 of the connector body 30. A substantially heart-shaped cam groove 41 for forming an alternate mechanism is formed at one end of the top surface of the slider 40. As shown in FIG. 5A, this cam groove 41 has a first support point 41a at which an operation is started, a second support point 41b at which one end 51b of the lever 51 moved away from the first support point 41a falls, a third support point 41c at which one end 51b of the lever 51 moved away from the second support point 41b falls and settles itself, and a fourth support point 41d at which one end 51b of the lever 51 moved away from the third support point 41c falls.

A slide groove 42 engaged by a guide pin 57 is formed in the center of the slider 40, the pin 57 being mounted on a locking pawl 56 (described later). A support protrusion 43 that supports a coil spring 58 is formed at the other end of the slider 40. The coil spring 58 biases the locking pawl 56 inward.

As shown in FIGS. 5B and 5C, a recess 44 for receiving the coil spring 52 is formed at one end of the bottom surface of the slider 40. Protrusions 45a and 45b having the same height protrude from the bottom surface of the slider 40 to prevent the slider 40 itself from tilting.

As shown in FIG. 8, the coil spring 52 is fitted over the support protrusion 36a of the connector body 30. Then, the coil spring 58 is mounted to the support protrusion 43 of the slider 40. The guide pin 57 is mounted with a press fit in a hole 56a extending through the locking pawl 56. The guide pin 57 is fitted into the slide groove 42 in the slider 40. One end of the coil spring 58 is mounted in an insertion port 56b formed in the locking pawl 56, whereby the locking pawl 56 is biased inward. Then, the slider 40 is slidably mounted on the protrusion 34 on the connector body 30. At this time, the guide pin 57 is engaged in the guide groove 35. One end 51a of the substantially U-shaped lever 51 is inserted into the support hole 33 in the connector body 30. The other end 51b is anchored to the first support point 41a in the heart-shaped cam groove 41. The top shell 21 is mounted to the connector body 30 and they are assembled as a unit. At this time, the resilient pawl 24 on the top shell 21 is pressed against the lever 51 to limit the position. In this way, disengagement is prevented.

Figure 10:
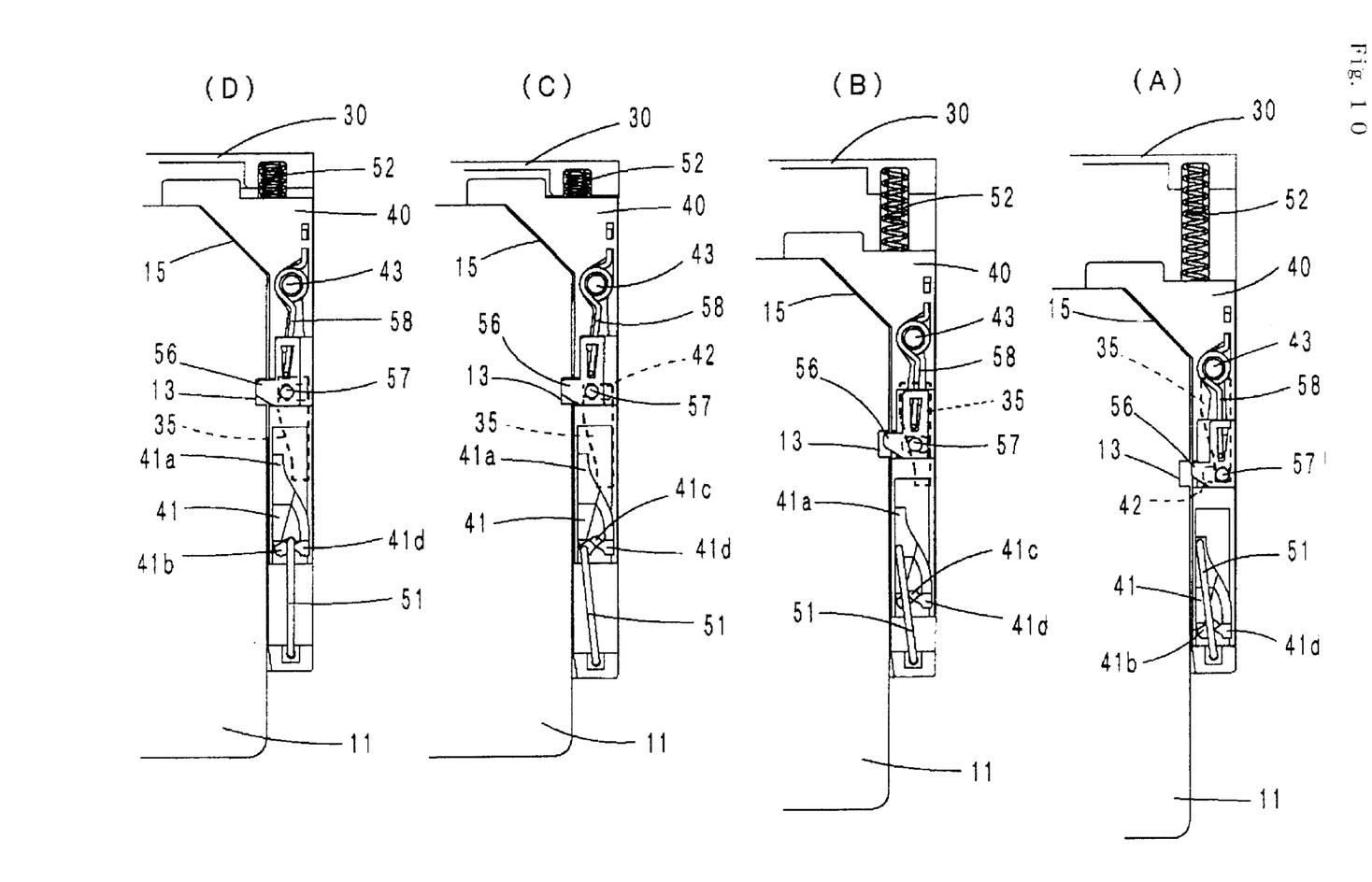
Figure 11:
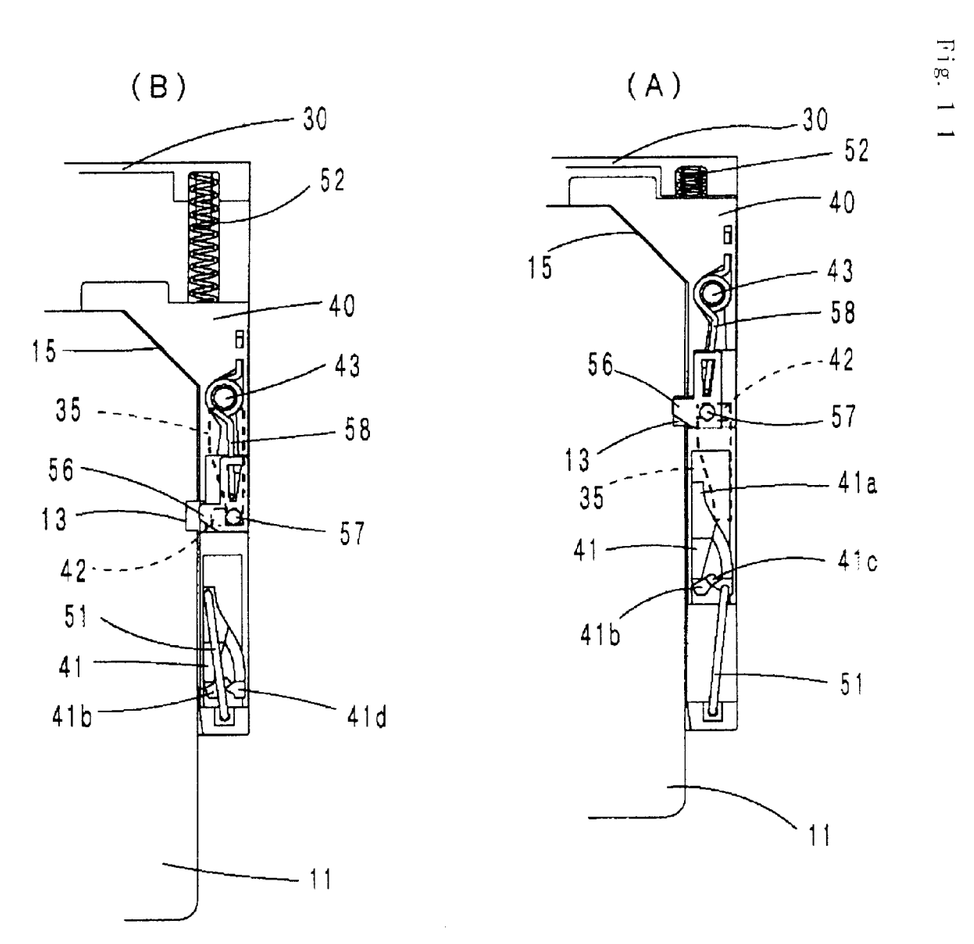

The locking pawl 56 is biased inward by the spring force of the coil spring 58 as shown in FIG. 10. Therefore, when the slider 40 slides into a deeper position, the guide pin 57 moves along the tapering guide groove 35. As the slider 40 goes deeper, the locking pawl 56 protrudes inward along the slide groove 42 and engages the locking recess 13 in the memory card 11.

The operation performed when the memory card 11 is inserted into the connector 20 composed of the aforementioned components is next described.

Before the memory card 11 is inserted, the slider 40 is located near the opening in the connector 20. The other end 51b of the lever 51 is located at the first support point 41a in the cam groove 41. The guide pin 57 is located ahead of the guide groove 35.

When the memory card 11 is inserted from the opening in the connector 20, the memory card 11 fits over the slider 40. The resilient pawls 22 and 23 on the top shell 21 push the card 11 against the connector body 30. If the memory card 11 is pushed in further, the slider 40 slides against the spring force of the coil spring 52. Concomitantly with this movement, the other end 51b of the lever 51 moves from the first support point 41a to the second support point 41b. Also, the guide pin 57 moves along the guide groove 35. Therefore, the locking pawl 56 biased inward rotates and is pushed forward into the locking recess 13 (FIGS. 10B and 10C) in the memory card 11, thus preventing the pawl from coming off. At the same time, the input/output interconnects 16 of the memory card 11 come into contact with their respective connector terminals 50.

In the present embodiment, where the insertion of the memory card 11 is done from the wrong side, the cutout 15 bears against the slider 40 to thereby prevent wrong insertion.

Where the inserted memory card 11 is turned upside down, the misinsertion preventive ribs 12 formed on both side surfaces of the connector body 30 bear against the edges of the opening in the arms 31 and 32 of the connector body 30. This creates the advantage that misinsertion is prevented with certainty.

When pushing of the memory card 11 is released, the spring force of the coil spring 58 pushes back the slider 40. However, the other end 51b of the lever 51 falls into the third support point 41c from the second support point 41b (FIG. 10D), thus hindering return of the slider 40. Therefore, the locking pawl 56 remains engaged in the locking recess 13. The memory card 11 is locked. There is no fear of the card coming off.

At this time, the locking pawl 56 is merely biased by the spring force of the coil spring 58 and so if the memory card 11 is forcibly pulled out, the locking pawl 56 is pushed back. There is no fear of the pawl becoming damaged.

As shown in FIG. 12, where the memory card 11 is mounted within the connector 20, the card 11 bears against the pressure contact portion 55b of the second movable contact terminal 55, and the movable contact portion 55a comes into contact with the first movable contact terminal 54. Therefore, insertion of the memory card 11 can be detected. Since the switch 14 for inhibiting writing is located in its forward position, the switch 14 is not pressed against the pressure contact portion 54b of the first movable contact terminal 54. Consequently, the movable contact portion 54a does not touch the fixed contact 53. It is possible to detect that the card is in a write inhibit condition.

If the write-inhibit switch 14 is located on the side of insertion as shown in FIG. 13, the switch 14 bears against the pressure contact portion 54b of the first movable contact terminal 54. Therefore, the movable contact portion 54a comes into contact with the fixed contact terminal 53. It is possible to detect that the card is in a writable condition.

When the memory card 11 is pushed in again, the other end 51b of the lever 51 moves from the third support point 41c to the fourth support point 41d. Concurrently, the locking pawl 56 is greatly pushed out into the locking recess 13 (FIG. 11A). However, when pushing of the memory card 11 is released, the other end 51b of the lever 51 returns to the first support portion 41a from the fourth support portion 41d (FIG. 11B). The spring force of the coil spring 52 pushes back the slider 40. The guide pin 57 is moved back along the guide groove 35. As a result, the locking pawl 56 slides within the slide groove 42 and retracts. This unlocks the memory card 11. It is possible to take out the card 11 by lightly pulling it out against the spring force of the resilient pawls 22 and 23.

Since the resilient pawls 22 and 23 push against the memory card 11, if it is pushed back by the spring force of the coil spring 52, there is no danger that the memory card 11 will be ejected from the connector 20.

Figure 14:
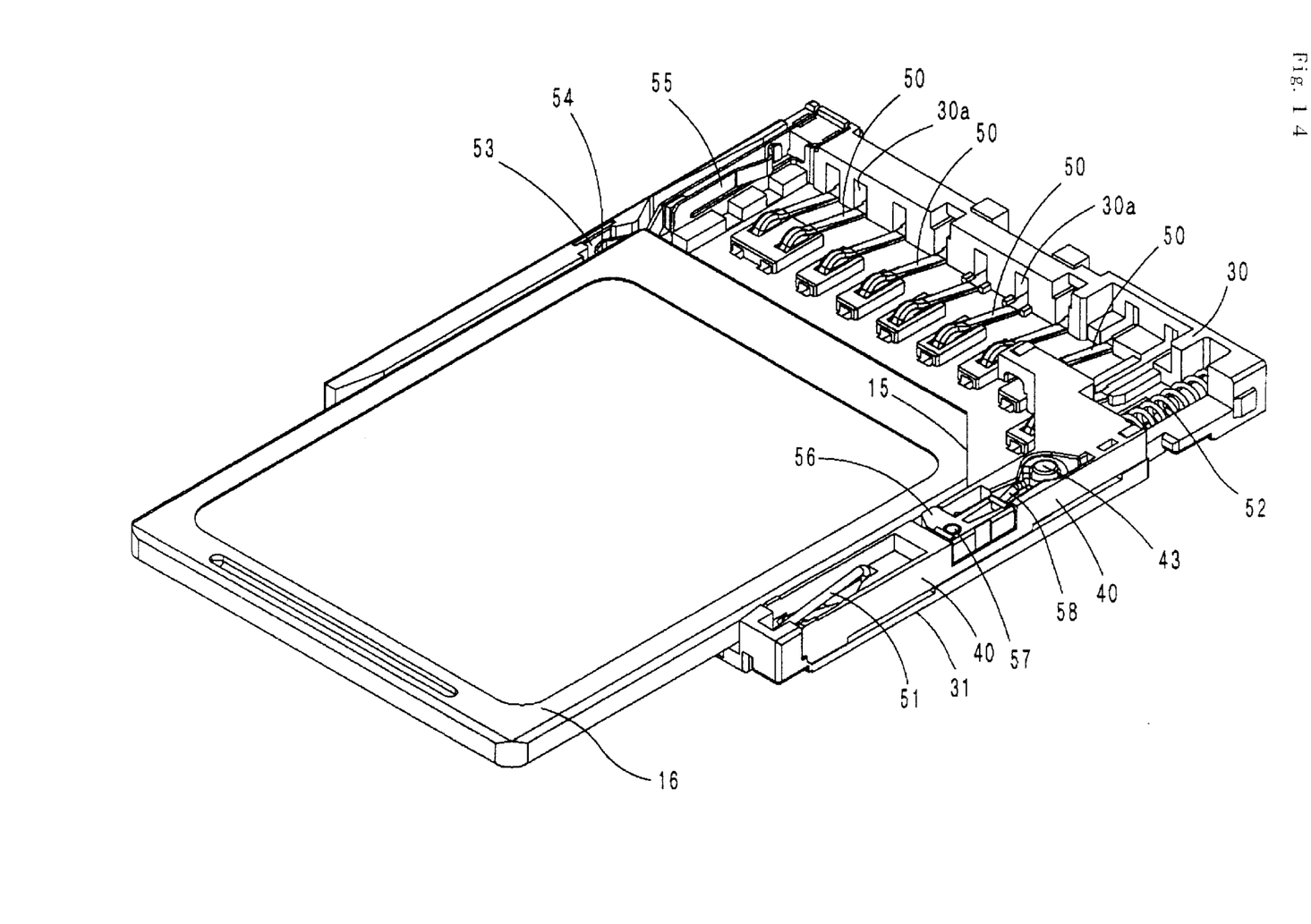
FIG. 14 is a perspective view showing the manner in which a memory card having no locking recess is being mounted to the connector shown in FIG. 2.
Figure 15:
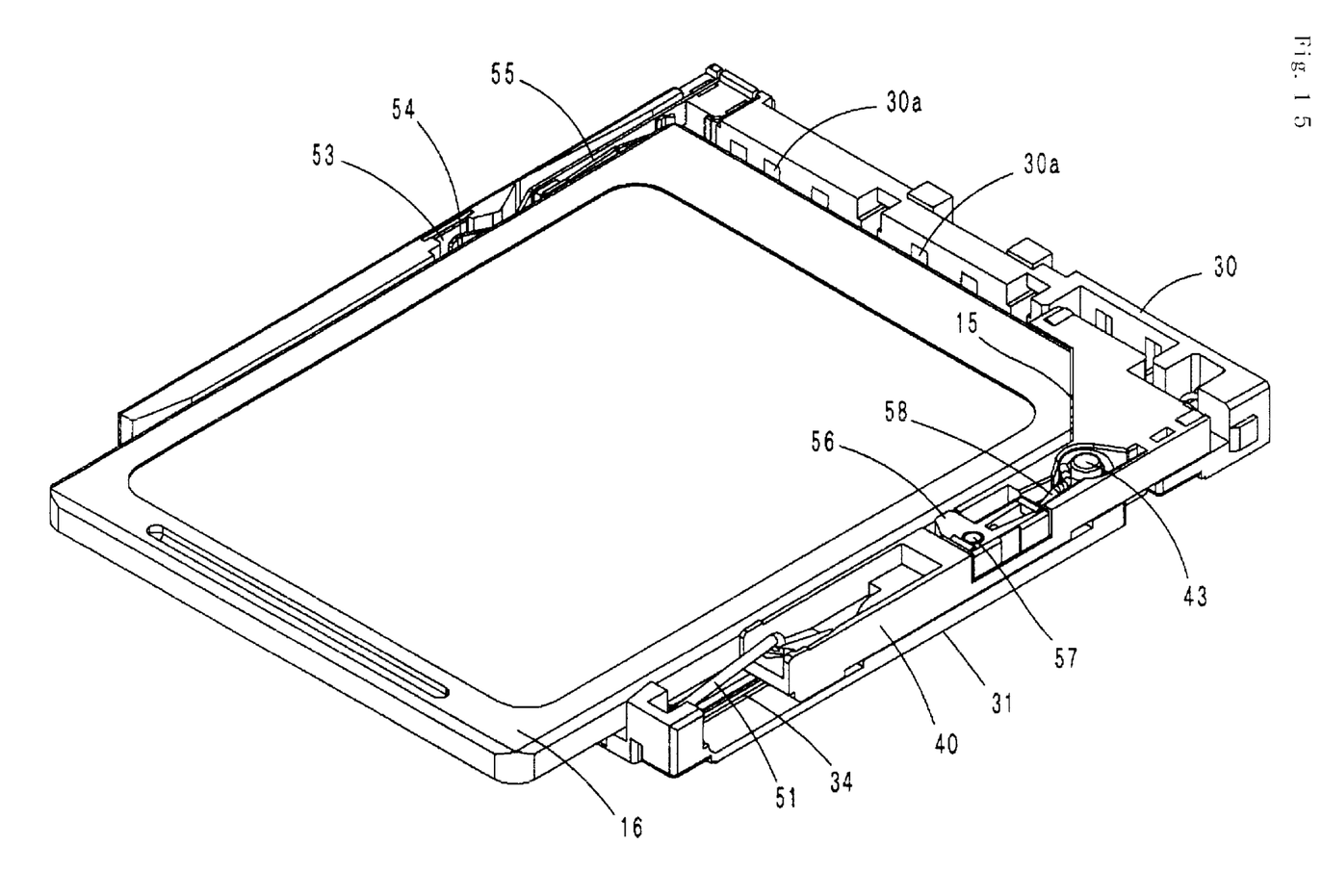
FIG. 15 is a perspective view similar to FIG. 14, but in which the memory card having no locking recess has been mounted to the connector shown in FIG. 2.

The case where the memory card 16 is not provided with a locking recess is next described by referring to FIGS. 14 and 15.

Before the memory card 16 is inserted, the slider 40 is located near the opening in the connector 20 in the same way as the foregoing. The other end 51b of the lever 51 is located at the first support point 41a in the cam groove 41. The guide pin 58 is located ahead of the guide groove 35.

When the memory card 16 not provided with a locking recess is inserted, the card 16 fits over the slider 40. The resilient pawls 22 and 23 on the top shell 21 press the card 16 against the connector body 30. If the card 16 is pushed in further, the slider 40 slides against the spring force of the coil spring 52. Concomitantly with this movement, the other end 51b of the lever 51 moves from the first support point 41a to the second support point 41b. The guide pin 57 moves along the guide groove 35. Therefore, the locking pawl 56 biased inward rotates. However, the locking pawl 56 is merely pressed against the memory card 16, because the card 16 has no locking recess. The input/output interconnects 16 of the memory card 16 are connected with their respective connector terminals 50.

When pushing of the memory card 16 is released, the spring force of the coil spring 58 pushes back the slider 40. The other end 51b of the lever 51 falls into the third support point 41c from the second support point 41b. This hinders return of the slider 40. At this time, the locking pawl 56 does not engage a locking recess but the memory card 16 is pressed against the connector body 30 by the resilient pawls 22 and 23. Consequently, there is no fear of the card coming off.

At this time, if the memory card 16 is forcibly pulled out, there is no danger of the locking pawl 56 being destroyed because it is merely pressed against the card 16. If the memory card 11 having the locking recess 13 is inserted immediately thereafter, the locking pawl 56 can be pushed back and mounted to the slider 40 that has been locked, because the locking pawl 56 is merely biased inward. Similarly, if the memory card 16 having no locking recess is inserted, the locking pawl 56 can be pushed back and mounted to the slider 40 that has been locked.

When the memory card 16 is mounted within the connector 20, one side surface of the card 16 bears against the pressure contact portion 54b of the first movable contact terminal 54, and the movable contact portion 54a touches the fixed contact terminal 53. Furthermore, one side surface of the memory card 16 bears against the pressure contact portion 55b of the second movable contact terminal 55. Therefore, the movable contact portion 55a comes into contact with the first movable contact terminal 54.

If the memory card 16 is pushed in again, the other end 51b of the lever 51 moves from the third support point 41c to the fourth support point 41d. If pushing of the memory card 16 is released, the other end 51b of the lever 51 returns to the first support portion 41a from the fourth support portion 41d. Therefore, the slider 40 is pushed back by the spring force of the coil spring 52. The memory card 16 protrudes out of the connector 20. It is possible to take out the memory card 16 by lightly pulling it out against the spring force of the resilient pawls 22 and 23.

Since the memory card 16 is pressed against the connector body 30 by the resilient pawls 22 and 23, if the card 16 is pushed back by the force of the coil spring 52, there is no danger that the card 16 will be ejected out of the connector 20.

In the present embodiment described thus far, the resilient pawls 22 and 23 prevent the memory cards 11 and 16 from being ejected. It is to be understood that the resilient pawls 22 and 23 are not essential. They may be mounted if necessary.

According to the present invention, the locking pawl engages the locking recess and becomes locked where a memory card provided with a locking recess is inserted. Where a memory card provided with no locking recess is inserted, the locking pawl biased inward by a spring material is pressed against the side surface of the memory card. In this way, the memory card not formed with a locking recess is accepted. Therefore, there is the advantage that a connector is obtained with which memory cards having different contours can be connected.

What is claimed is:

1. A connector for use with a memory card having a one-end portion inserted from an opening portion, said memory card having input/output interconnects capable of being electrically connected with an external circuit, said connector being capable of locking said memory card, said connector comprising:

a connector body provided with a tapering guide groove;

a slider slidably mounted to said connector body via a coil spring to thereby form an alternate mechanism, said slider being provided with a groove extending perpendicular to a direction of slide;

a locking pawl slidably fitted in said groove of the slider, said locking pawl being engaged in the tapering guide groove of said connector body via a guide pin, said locking pawl being capable of engaging a locking recess formed in one side surface of said memory card; and a spring material mounted to said slider and constantly biasing said locking pawl inward;

wherein, when the memory card is pushed in and concomitantly the slider slides, the locking pawl engages the locking recess in the memory card and, when the card is pushed out and concomitantly the slider slides, the locking pawl comes out of the locking recess in the memory card.

2. A connector for use with a memory card according to claim 1, wherein said spring material is a coil spring for giving a biasing force that rotates said locking pawl.

* * * * *